Figure 1:
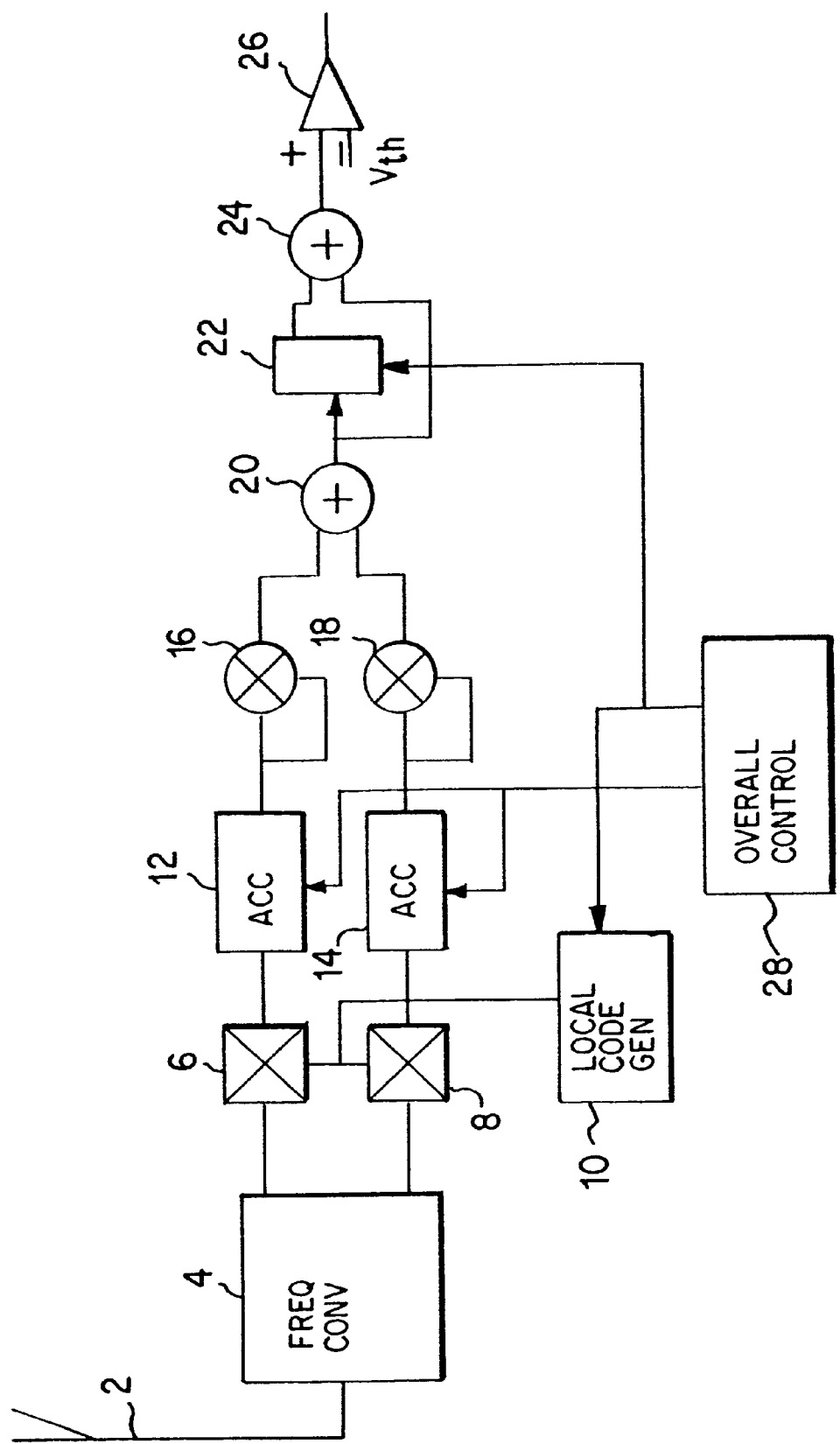

United States Patent

Hulbert et al.

[11] Patent Number: 6,104,322
[45] Date of Patent: Aug. 15, 2000

[54] APPARATUS FOR ACQUIRING CODE PHASE LOCK IN DIRECT SEQUENCE SPREAD SPECTRUM SYSTEMS

[75] Inventors: Anthony Peter Hulbert, Southampton; David Peter Chandler, Romsey, both of United Kingdom

[73] Assignee: Roke Manor Research Limited, Hampshire, United Kingdom

[21] Appl. No.: 09/155,393
[22] PCT Filed: Mar. 28, 1996
[86] PCT No.: PCT/GB96/00745
 § 371 Date: Aug. 24, 1999
 § 102(e) Date: Aug. 24, 1999
[87] PCT Pub. No.: WO97/37436
 PCT Pub. Date: Oct. 9, 1997

[51] Int. Cl.[7] .................................................. H03M 7/00
[52] U.S. Cl. .................................................. 341/50; 375/1
[58] Field of Search .................... 341/50, 51, 53, 341/54; 375/200, 208, 316, 34

[56] References Cited

U.S. PATENT DOCUMENTS

| 4,903,279 | 2/1990 | Murakami | ..................................... 375/1 |
| 5,778,023 | 7/1998 | Ideta | ......................................... 375/208 |

Primary Examiner—Brian Young
Attorney, Agent, or Firm—Evenson, McKeown, Edwards & Lenahan, P.L.L.C.

[57] ABSTRACT

The apparatus receives an input signal via an antenna or cable 2, and the signal is applied to a frequency converter 4. Frequency converter generates complex I Q baseband signals which are applied to a respective correlator comprising a multiplier 6 and an accumulator 12 in respect of the inphase signal and the multiplier 8 and an accumulator 14 in respect of the quadrature phase signal. The output of the correlators are subjected to a modulus squaring function which comprises multipliers 16, 18 and an adder 20. The output of the adder 20 is applied to a store 22, and the inputs and outputs to the store are arranged to be added together in an adder 24, the output of which is compared in a comparator 26. The correlators and store are controlled by a controller 28 which is arranged to control the setting and resetting of the accumulators 12 and 14. For a fixed interval of time a local code generator is held constant, the output of which is applied to an input of the multiplier 6, 8, and at the start of the interval the accumulators 12, 14 are reset to zero and allowed to accumulate. At the end of the period the comparison is performed and thereafter the codes generated are shifted by one chip and the accumulators 12, 14 are set to zero and the output of the adder 20 is clocked into the storage means 22. This process is repeated until such time as the threshold values exceeded as determined by the comparator 26.

6 Claims, 1 Drawing Sheet

APPARATUS FOR ACQUIRING CODE PHASE LOCK IN DIRECT SEQUENCE SPREAD SPECTRUM SYSTEMS

This invention relates to direct sequence spread spectrum systems and in particular the initial acquisition of code phase lock.

In such systems a spread spectrum transmitter transmits a code consisting of a sequence which may be of considerable length. A receiver, which has not acquired time synchronisation, performs correlations against the received sequence until such time as energy is found exceeding a threshold. These correlations are performed for a variety of phase shifts of the code and in general these phase shifts consist of whole numbers of chips but also the incoming signal is sampled usually several times per chip. This ensures that when the various phases of the code are tested the peak of the correlation function or a place close to it is found avoiding losses associated with sampling of the code away from the correlation peak.

EP-A-0 668 663 discloses a sliding correlation detector in which stored signals are multiplied with a replica of the spread series codes and integrated over time. A threshold judging circuit determines whether the integrated value exceeds a threshold limit. If the limit is not exceeded, the phase of the replica of the spread series codes is changed and the process repeated.

U.S. Pat. No. 4,894,842 discloses a precorrelation digital spread spectrum receiver in which RF band spread signals are converted to a digitised baseband signal comprising a sequence of N-bit quantised baseband values. A correlator correlates successive baseband signal values with successive local code values to produce the correlation signals which are accumulated to provide process gain and form error signals for tracking. The receiver is intended for use as part of a GPS navigation system.

U.S. Pat. No. 5,105,437 discloses a programmable digital acquisition and tracking controller which provides an output signal which is indicative of the correlation between the received PN code and the locally generated PN code as compared with a threshold. Programmable detector logic detects acquisition correlation and tracking correlation and switches from acquisition to tracking once the I and Q data channels have been acquired.

In prior systems the transmitted signal consisted of a rectangular pulse for each chip and this led to an auto correlation function which was triangular for this case. If one was to sample as much as a half of a chip out of phase this would result in a degradation of six decibels. More recently band limiting functions have been applied to the transmitted spectrum, typically raised cosine pulses, and here the attenuation through sampling half a chip away from the optimum point is reduced of the order 4.2 decibels. Thus, one may consider the possibility of sampling as infrequently as once per chip, however 4.2 decibels is still an unacceptably large degradation. An aim of the present invention is to significantly reduce the loss in this case.

According to one aspect of the present invention, there is provided apparatus for acquiring a code phase lock in a direct sequence spread spectrum system comprising:— means for receiving an input signal; means for converting the received input signal into inphase and quadrature components of a complex baseband signal; means for performing a modulus squared function on said complex baseband signal; and comparing means for comparing said modulus squared function with a threshold value; characterised in that the apparatus further comprises: first and second correlators for respectively receiving said inphase and said quadrature components of said complex baseband signal; storage means for storing the results of said modulus squared function prior to said comparing means; adding means for adding together inputs to said storage means with outputs therefrom which represent correlations spaced apart by one chip difference in code phase; and control means for controlling said correlators and said storage means.

The principle is to apply effective interpolation to the outputs of the correlators. This means that the number of correlations which have to be performed is not increased and the benefits of one sample per chip essentially affording a fifty per cent reduction in complexity are fully realised, however, the effective interpolation is implemented in a fashion which is very straight forward and consists of taking adjacent correlations samples in pairs, adding them and comparing with a modified threshold. Analysis shows that in the best case, that is to say where the sampling happens to be in the optimum position the loss due to this procedure is of the order 0.5 decibels. However, in the worst case, this additional loss also applies, but is accompanied by a gain of three decibels, thus the original worst case of 4.2 decibels is improved to a figure of 4.2+0.5−3 decibels=1.7 decibels. Thus a very considerable improvement is obtained and the performance for one sample per chip is improved to approximately 0.7 decibels inferior to two samples per chip.

An embodiment of the present invention will now be described with reference to the accompanying drawing, FIG. 1, which shows a block diagram of a circuit for obtaining code phase lock.

Referring to FIG. 1, the signal is received by signal input means shown as an antenna 2, this is converted to complex baseband I, Q by a frequency converter means 4, the I and Q signals are individually multiplied by samples from a local generator 10, in multipliers 6, 8. The outputs of these multipliers are fed into accumulators 12, 14. Thus, the multiplier 6 and the accumulator 12, the multiplier 8 and the accumulator 14 comprise correlators. The output of the accumulators 12, 14 are connected to multipliers 16, 18 respectively. The output of the multipliers 16, 18 are connected to an adder 20, and together form a modulus squared function on the correlator outputs, thus the output of the adder 20 corresponds to an energy measurement on the correlation formed. The result obtained is stored over a correlation interval in the storage means 22 which is shown as a multiple D type flip flop. At the end of each clocking interval the inputs to the storage means and outputs from the storage means representing correlations spaced apart by a one chip difference in code phase are added together in the adder 24 and compared with a threshold using comparator means 26. The operation of the whole circuitry is under control of controller means 28. The controller means 28 controls the code phase of the local code generator and also controls the setting and resetting of the accumulator 12,14. Thus, for a fixed interval known hereinafter as the correlation interval the local code generator phase is held constant and at the start of this interval the accumulators 12, 14 are reset to zero and allowed to accumulate. At the end of this period the comparison is performed and momentarily after that the codes generated are shifted by one chip and the accumulators 12, 14 are set to zero and the output of adder 20 is clocked into the storage means 22. The process is repeated and some cyclic shifting of the local code generator is being performed until such time as the threshold is exceeded.

It will be appreciated by those skilled in the art that various alternative implementations are possible which fall within the scope of the present invention. For example, the above description relates to binary phase shift keying BPSK, but it will be realised that it may be used for quadrature phase shift keying QPSK, by multiplying the output of the frequency converter by a complex code.

Also, connection to the frequency connector may be via cables, and not via a radio antenna.

What is claimed is:

1. Apparatus for acquiring a code phase lock in a direct sequence spread spectrum system comprising:

means (2) for receiving an input signal means (4) for converting the received input signal into inphase and quadrature components of a complex baseband signal;

means (16, 18, 20) for performing a modulus squared function on said complex baseband signal; and comparing means (26) for comparing said modulus squared function with a threshold value;

characterised in that the apparatus further comprises:

first and second correlators (6, 12, 8, 14) for respectively receiving said inphase and said quadrature components of said complex baseband signal;

storage means (22) for storing the results of said modulus squared function prior to said comparing means (26);

adding means (24) for adding together inputs to said storage means (22) with outputs therefrom which represent correlations spaced apart by one chip difference in code phase; and control means (28) for controlling said correlators (6, 12, 8, 14) and said storage means (22).

2. Apparatus according to claim 1, wherein each correlator (6, 12, 8, 14) comprises a multiplier (6, 8) and an accumulator (12, 14), the setting and resetting of each accumulator (12, 14) being controlled by said control means (28).

3. Apparatus according to claim 2, wherein said means (16, 18, 20) for performing said modulus squared function comprises first and second multipliers (16, 18) connected respectively to an output of one of the accumulators (12, 14), and an adder (20) for adding together output signals generated by said multipliers (16, 18), each multiplier (16, 18) being arranged to square the output for its associated accumulator (12, 14).

4. Apparatus according to claim 2, further comprising a code generator (10) connected to said accumulators (12, 14), said code phase of said code generator (10) being controlled by said control means (28).

5. Apparatus according to claim 4, wherein, over a known interval, said control means:

a) controls the code phase of said code generator (10) so that it is held constant;

b) resets said accumulators (12, 14) at the start of the interval and allows them to accumulate;

c) at the end of the interval, stores the result of said modulus squared function in said storage means (22), said comparing means (26) determining if said threshold value has been exceeded; and d) if said threshold value has not been exceeded, shifts said code by one chip and repeats steps b) and c) until said threshold value has been exceeded.

6. Apparatus according to claim 3, further comprising a code generator connected to said accumulators, said code phase of said code generator being controlled by said control means.

* * * * *